United States Patent
Lemons

(10) Patent No.: US 8,843,377 B2
(45) Date of Patent: Sep. 23, 2014

(54) SYSTEM AND METHOD FOR FOREIGN LANGUAGE PROCESSING

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 1920 days.

(21) Appl. No.: 12/148,577

(22) Filed: Apr. 21, 2008

(65) Prior Publication Data
US 2008/0274443 A1    Nov. 6, 2008

Related U.S. Application Data

(60) Provisional application No. 60/913,017, filed on Apr. 20, 2007, provisional application No. 60/913,015, filed on Apr. 20, 2007, provisional application No. 60/913,010, filed on Apr. 20, 2007, provisional application No. 60/830,386, filed on Jul. 12, 2006, provisional application No. 60/921,578, filed on Apr. 3, 2007.

(51) Int. Cl.
*G10L 21/06*    (2013.01)

(52) U.S. Cl.
USPC ..................................... 704/276

(58) Field of Classification Search
USPC ................................ 704/275–277
See application file for complete search history.

(56) References Cited

U.S. PATENT DOCUMENTS

| | | |
|---|---|---|
| 347,686 A | 8/1886 | Carpenter et al. |
| 2,804,500 A | 8/1957 | Giacoletto |
| 3,698,277 A | 10/1972 | Barra |
| 3,969,972 A | 7/1976 | Bryant |
| 4,128,846 A | 12/1978 | Robinson, Jr. |
| 4,172,406 A | 10/1979 | Martinez |
| 4,257,062 A | 3/1981 | Meredith |
| 4,378,466 A | 3/1983 | Esser |
| 4,526,168 A | 7/1985 | Hassler et al. |
| 4,887,507 A | 12/1989 | Shaw |
| 4,907,573 A | 3/1990 | Nagasaki |

(Continued)

FOREIGN PATENT DOCUMENTS

| | | |
|---|---|---|
| EP | 0349686 | 1/1990 |
| EP | 456 860 A1 | 11/1991 |

(Continued)

OTHER PUBLICATIONS

Patent Application Search Report mailed on Aug. 1, 2008 for PCT/US2008/59126.

(Continued)

*Primary Examiner* — Abul Azad
(74) *Attorney, Agent, or Firm* — Ice Miller LLP

(57) ABSTRACT

The present disclosure relates to foreign language instruction and translation methods. A system is provided which utilizes tonal and rhythm visualization components to allow a person to "see" their words as they attempt to speak a foreign language or a specific regional dialect. The system is also applicable to foreign language translation systems and allows students to improve their pronunciation by responding to visual feedback which incorporates both color and shape. The system may comprise a step-by-step instruction method, along with recording and playback features. Certain embodiments incorporate statistical analysis of student progress, remote access for teacher consultation, and video games for enhancing student interest.

15 Claims, 17 Drawing Sheets
(11 of 17 Drawing Sheet(s) Filed in Color)

(56) References Cited

U.S. PATENT DOCUMENTS

| | | | |
|---|---|---|---|
| 5,048,390 A | 9/1991 | Adachi et al. | |
| 5,207,214 A | 5/1993 | Romano | |
| 5,370,539 A | 12/1994 | Dillard | |
| 5,415,071 A | 5/1995 | Davies | |
| 5,563,358 A | 10/1996 | Zimmerman | |
| 5,741,990 A | 4/1998 | Davies | |
| 5,784,096 A | 7/1998 | Paist | |
| 6,031,172 A | 2/2000 | Papadopoulos | |
| 6,111,755 A | 8/2000 | Park | |
| 6,127,616 A | 10/2000 | Yu | |
| 6,137,041 A | 10/2000 | Nakano | |
| 6,201,769 B1 | 3/2001 | Lewis | |
| 6,245,981 B1 | 6/2001 | Smith | |
| 6,265,651 B1 | 7/2001 | Landtroop | |
| 6,350,942 B1 | 2/2002 | Thomson | |
| 6,390,923 B1 | 5/2002 | Yoshitomi et al. | |
| 6,392,131 B2 | 5/2002 | Boyer | |
| 6,407,323 B1 | 6/2002 | Karapetian | |
| 6,411,289 B1 | 6/2002 | Zimmerman | |
| 6,414,230 B2 | 7/2002 | Randall | |
| 6,448,487 B1 | 9/2002 | Smith | |
| 6,544,123 B1 | 4/2003 | Tanaka et al. | |
| 6,686,529 B2 | 2/2004 | Kim | |
| 6,750,386 B2 | 6/2004 | King | |
| 6,791,568 B2 | 9/2004 | Steinberg et al. | |
| 6,841,724 B2 | 1/2005 | George | |
| 6,856,329 B1 | 2/2005 | Peevers et al. | |
| 6,927,331 B2 | 8/2005 | Haase | |
| 6,930,235 B2 | 8/2005 | Sandborn et al. | |
| 6,987,220 B2 | 1/2006 | Holcombe | |
| 7,030,307 B2 | 4/2006 | Wedel | |
| 7,096,154 B1 | 8/2006 | Andrade-Cetto | |
| 7,153,139 B2 | 12/2006 | Wen et al. | |
| 7,182,601 B2 | 2/2007 | Donnan | |
| 7,202,406 B2 | 4/2007 | Coleman | |
| 7,212,213 B2 | 5/2007 | Steinberg et al. | |
| 7,271,328 B2 | 9/2007 | Pangrle | |
| 7,271,329 B2 | 9/2007 | Franzblau | |
| 7,400,361 B2 | 7/2008 | Noske et al. | |
| 7,439,438 B2 | 10/2008 | Hao | |
| 7,521,619 B2 | 4/2009 | Salter | |
| 7,538,265 B2 | 5/2009 | Lemons | |
| 7,548,791 B1 * | 6/2009 | Johnston | 700/94 |
| 7,589,269 B2 * | 9/2009 | Lemons | 84/483.2 |
| 7,634,405 B2 | 12/2009 | Basu et al. | |
| 7,663,043 B2 | 2/2010 | Park | |
| 7,667,125 B2 | 2/2010 | Taub et al. | |
| 7,671,266 B2 * | 3/2010 | Lemons | 84/609 |
| 7,714,222 B2 | 5/2010 | Taub et al. | |
| 8,073,701 B2 * | 12/2011 | Lemons | 704/273 |
| 8,676,795 B1 * | 3/2014 | Durgin et al. | 707/730 |
| 2002/0050206 A1 | 5/2002 | MacCutcheon | |
| 2002/0176591 A1 | 11/2002 | Sandborn et al. | |
| 2003/0205124 A1 | 11/2003 | Foote et al. | |
| 2004/0089132 A1 | 5/2004 | Georges et al. | |
| 2004/0148575 A1 | 7/2004 | Haase | |
| 2004/0206225 A1 | 10/2004 | Wedel | |
| 2005/0190199 A1 | 9/2005 | Brown et al. | |
| 2005/0241465 A1 | 11/2005 | Goto | |
| 2006/0107819 A1 | 5/2006 | Salter | |
| 2006/0132714 A1 | 6/2006 | Nease et al. | |
| 2007/0044639 A1 | 3/2007 | Farbood et al. | |
| 2007/0157795 A1 | 7/2007 | Hung | |
| 2007/0180979 A1 | 8/2007 | Rosenberg | |
| 2008/0022842 A1 | 1/2008 | Lemons | |
| 2008/0034947 A1 | 2/2008 | Sumita | |
| 2008/0115656 A1 | 5/2008 | Sumita | |
| 2008/0190271 A1 | 8/2008 | Taub et al. | |
| 2008/0245212 A1 | 10/2008 | Lemons | |
| 2008/0264239 A1 | 10/2008 | Lemons et al. | |
| 2008/0271589 A1 | 11/2008 | Lemons | |
| 2008/0271590 A1 | 11/2008 | Lemons | |
| 2008/0271591 A1 | 11/2008 | Lemons | |
| 2008/0276790 A1 | 11/2008 | Lemons | |
| 2008/0276791 A1 | 11/2008 | Lemons | |
| 2008/0276793 A1 | 11/2008 | Yamashita et al. | |
| 2008/0314228 A1 | 12/2008 | Dreyfuss et al. | |
| 2009/0223348 A1 | 9/2009 | Lemons | |
| 2010/0154619 A1 | 6/2010 | Taub et al. | |

FOREIGN PATENT DOCUMENTS

| | | |
|---|---|---|
| EP | 1354561 A1 | 10/2003 |
| JP | 05-232856 | 9/1993 |
| JP | 2004-226556 A | 8/2004 |
| KR | 10-2006-0110988 | 10/2006 |

OTHER PUBLICATIONS

Patent Application Search Report mailed on Aug. 14, 2008 for PCT/US2008/004989.
Patent Application Search Report mailed on Aug. 18, 2008 for PCT/US2008/005069.
Patent Application Search Report mailed on Aug. 18, 2008 for PCT/US2008/005073.
Patent Application Search Report mailed on Aug. 18, 2008 for PCT/US2008/005126.
Patent Application Search Report mailed on Aug. 21, 2008 for PCT/US2008/005076.
Patent Application Search Report mailed on Aug. 27, 2008 for PCT/US2008/005075.
Patent Application Search Report mailed on Aug. 28, 2008 for PCT/US2008/005077.
Patent Application Search Report mailed on Jul. 31, 2008 for PCT/US2008/005070.
Patent Application Search Report mailed on Sep. 18, 2008 for PCT/US2008/005072.
Patent Application Search Report mailed on Sep. 18, 2008 for PCT/US2008/05124.
Patent Application Search Report mailed on Sep. 24, 2008 for PCT/US2008/005125.
Patent Application Search Report mailed on Sep. 29, 2008 for PCT/US2008/005074.
Rabiner, Huang "Fundamentals of Speech Recognition," PTR Prentice-Hall, Inc., 1993, ISBN 0-13-285826-6, pp. 21-31, 42-68; Fig. 2.17, 2.32.
International Preliminary Search Report dated Jul. 19, 2009 fro PCT/US08/05075.
Patent Application Search Report mailed on Aug. 25, 2009 for PCT/US2009/000684.
Written Opinion mailed on Aug. 25, 2009 for PCT/US2009/00684.
"Time-line of the Music Animation Machine (and related experiments)", Music Animation Machine: History, http://www.musanim.com/mam/mamhist.htm, pp. 1-5, p. 1, pp. 1-2, pp. 1-2 & p. 1, printed Aug. 30, 2007.
Ashton, Anthony, "Harmonograph: A Visual Guide to the Mathematics of Music," ISBN 0-8027-1409-9, Walker Publishing Company, 2003, pp. 1-58.
Bourke, Paul, "Harmonograph," Aug. 1999, http://local.wasp.uwa.edu.au/~pbourke/surfaces_curves/harmonograph/, pp. 1-6, printed Aug. 30, 2007.
Dunne, Gabriel, "Color/Shape/Sound Ratio & Symmetry Calculator," Quilime.com—Symmetry Calculator, https://www.quilime.com/content/colorcalc/, pp. 1-6, printed Jul. 3, 2007.

* cited by examiner

SYSTEM AND METHOD FOR FOREIGN LANGUAGE PROCESSING

CROSS-REFERENCE TO RELATED APPLICATIONS

The present application claims the benefit of U.S. Provisional Patent Application Ser. No. 60/913,017, filed Apr. 20, 2007, entitled "Method and Apparatus for Accent or Dialect Instruction", U.S. Provisional Patent Application Ser. No. 60/913,015 filed Apr. 20, 2007 entitled "Method and Apparatus for Foreign Language Instruction", and U.S. Provisional Patent Application Ser. No. 60/913,010, filed Apr. 20, 2007, entitled "Method and Apparatus for Foreign Language Translation." This application also relates to U.S. Provisional Patent Application Ser. No. 60/830,386 filed Jul. 12, 2006 entitled "Apparatus and Method for Visualizing Musical Notation", U.S. Utility patent application Ser. No. 11/827,264 filed Jul. 11, 2007 entitled "Apparatus and Method for Visualizing Music and Other Sounds", U.S. Provisional Patent Application Ser. No. 60/921,578, filed Apr. 3, 2007, entitled "Device and Method for Visualizing Musical Rhythmic Structures", and U.S. Utility patent application Ser. No. 12/023,375 filed Jan. 31, 2008 entitled "Device and Method for Visualizing Musical Rhythmic Structures". All of these applications are hereby incorporated by reference in their entirety.

TECHNICAL FIELD OF THE DISCLOSURE

The present disclosure relates generally to language instruction and translation and, more specifically, to a system and method for foreign language instruction and translation using analysis of tonal and rhythmic structures.

BACKGROUND OF THE DISCLOSURE

Learning a foreign language outside of a classroom environment is generally accomplished through the process of listening to, and then repeating, prerecorded words and phrases. Often, no feedback or critique is involved, so that the person attempting to learn the language has no idea if they are pronouncing words correctly. Without some form of instruction that verifies the accuracy of the spoken words, learning a foreign language is a hit or miss proposition. The process becomes even more difficult for individuals wishing to perfect regional or country-specific accents or dialects. Proper vocal techniques to learn and maintain an accent or dialect are difficult to master and it is often hard to progress in any significant way outside of the actual time spent with an instructor.

Some translation devices are available that employ the use of a language-to-language dictionary or phrasebook, but they generally require that the word in one language be typed via a small keyboard or keypad located on the device, with the corresponding foreign language word thereafter appearing. Some translators will generate a synthesized voice that gives a generic pronunciation of the word, but the translator does not provide a genuine pronunciation as one would expect from a person whose native language is that to which words and phrases are being translated. Methods are needed which improve the accuracy and efficiency of foreign language processing.

SUMMARY OF THE INVENTION

Accordingly, in one aspect, A foreign language processing system is disclosed, comprising a user input device, a processing device, and a display; wherein said processing device executes computer readable code to select a foreign language word which corresponds to the meaning of a native language word entered by a user using said user input device, wherein said processing device executes computer readable code to create a first visual representation of said foreign language word for output on said display; and wherein said first visual representation is generated according to a method comprising the steps of: (a) labeling the perimeter of a circle with a plurality of labels corresponding to a plurality of equally spaced frequency intervals in an octave, such that moving clockwise or counter-clockwise between adjacent ones of said labels represents a first frequency interval; (b) identifying an occurrence of a first frequency within the foreign language word; (c) identifying an occurrence of a second frequency within the foreign language word; (d) identifying a first label corresponding to the first frequency; (e) identifying a second label corresponding to the second frequency; (f) creating a first line connecting the first label and the second label.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
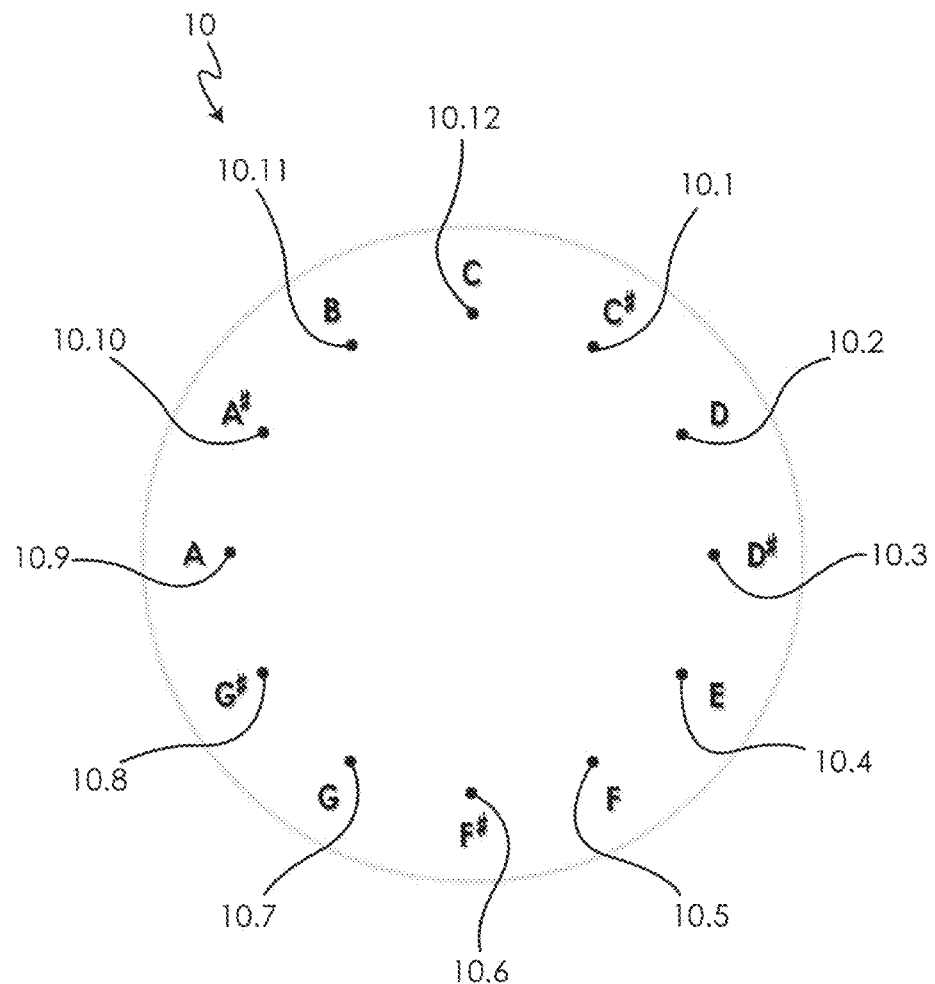
FIG. 1 is a diagram of a twelve-tone circle according to one embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Before describing the system and method of foreign language processing, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

| | |
|---|---|
| Major scale: | 2 steps, 2 steps, 1 step, 2 steps, 2 steps, 2 steps, 1 step |
| Harmonic Minor Scale: | 2, 1, 2, 2, 1, 3, 1 |
| Melodic Minor Scale: | 2, 1, 2, 2, 2, 2, 1 |

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales. Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (#'s) and 'flats' (b's) to cover the remaining five tones so that a single notation system can be used to encompass all three scales. For example, certain key signatures will have seven 'pure letter' tones (like 'A') in addition to sharp or flat tones (like $C^\#$ or $G^b$), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., $A^\#$ is the same as $B^b$), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
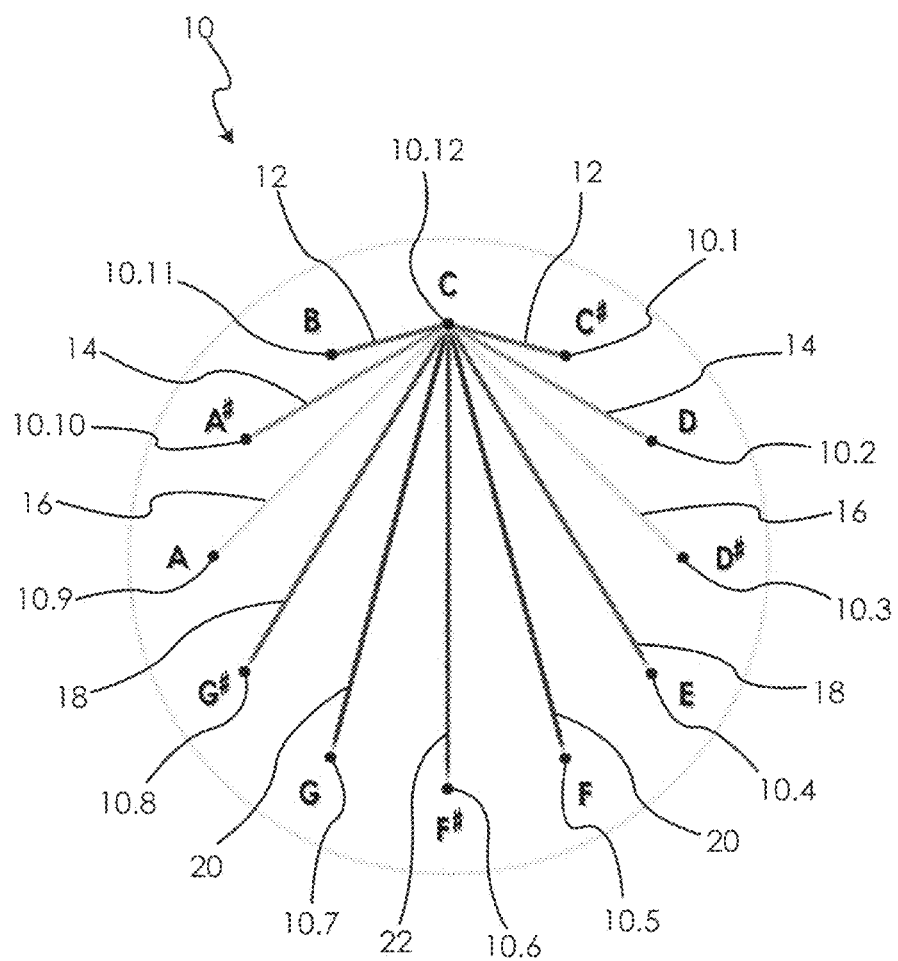
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines—their relative length and color—represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and $A^\#$ (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
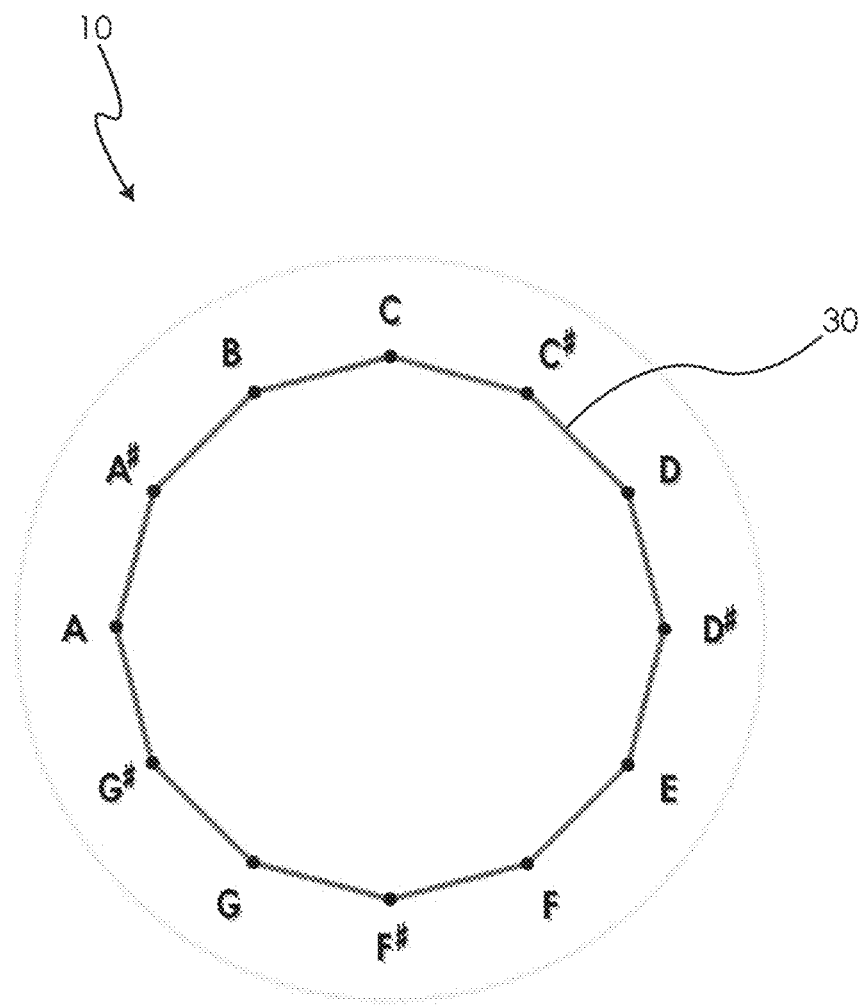
FIG. 3 is a diagram of a twelve-tone circle showing the chromatic scale.
Figure 4:
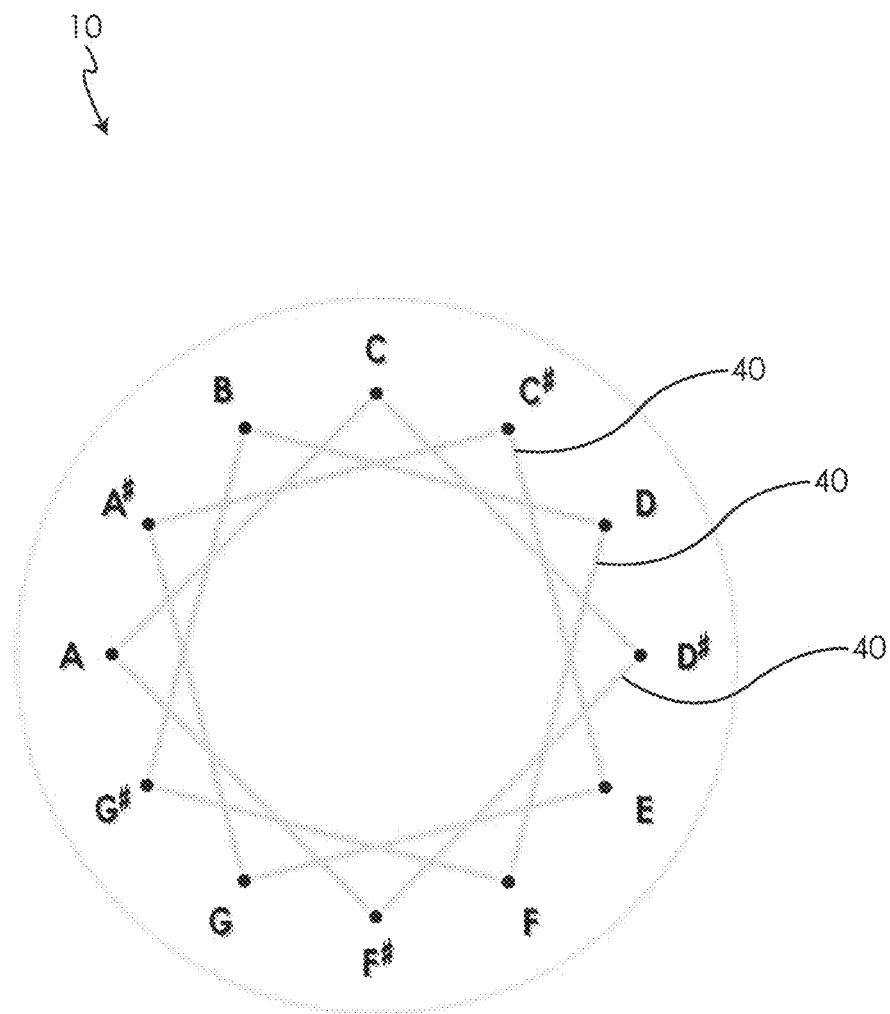
FIG. 4 is a diagram of a twelve-tone circle showing the first through third diminished scales.
Figure 5:
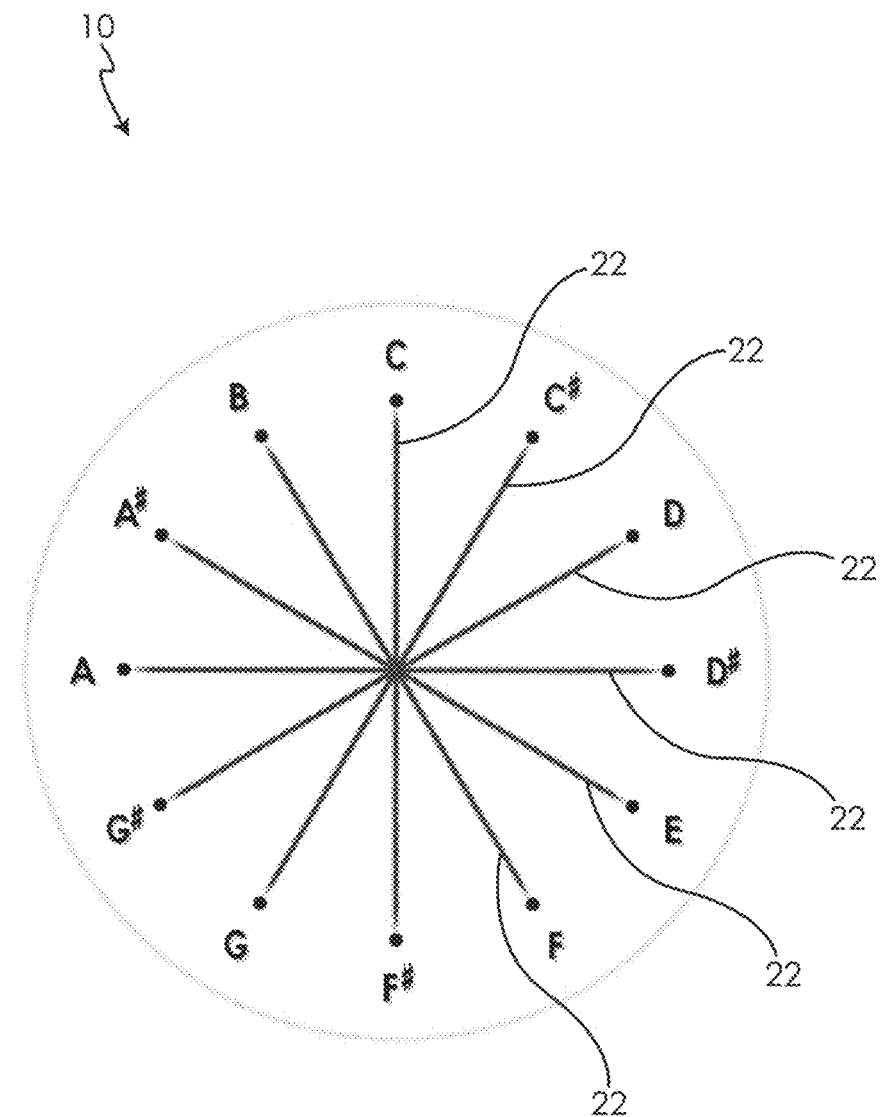
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

Figure 6:
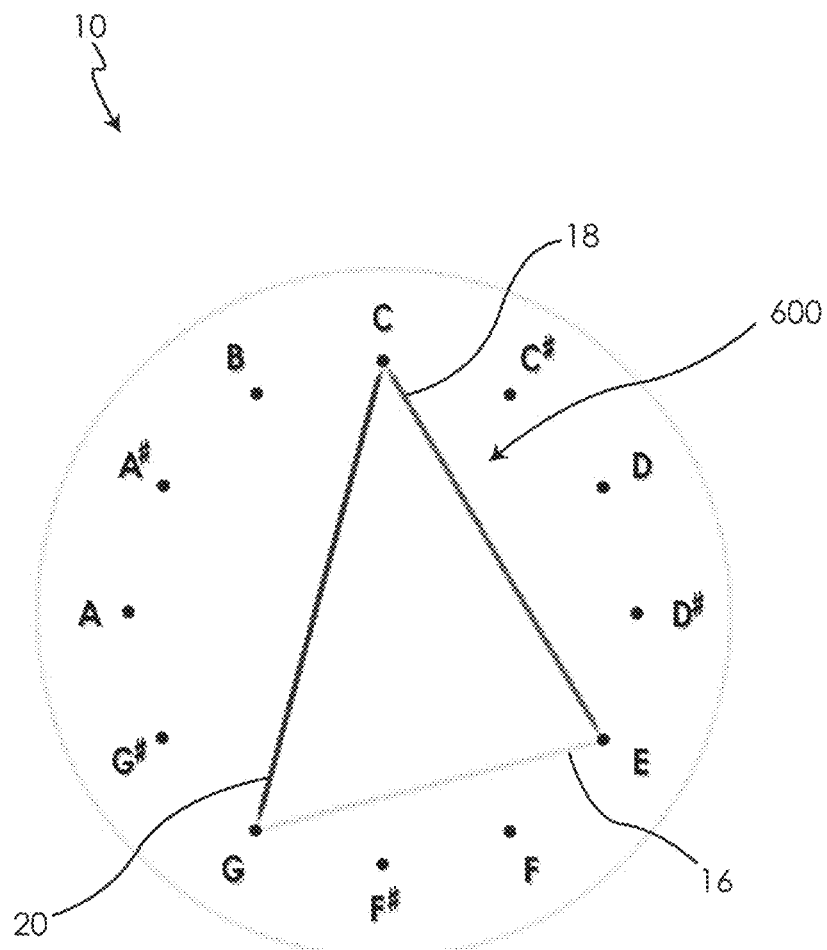
FIG. 6 is a diagram of a twelve-tone circle showing a major triad.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
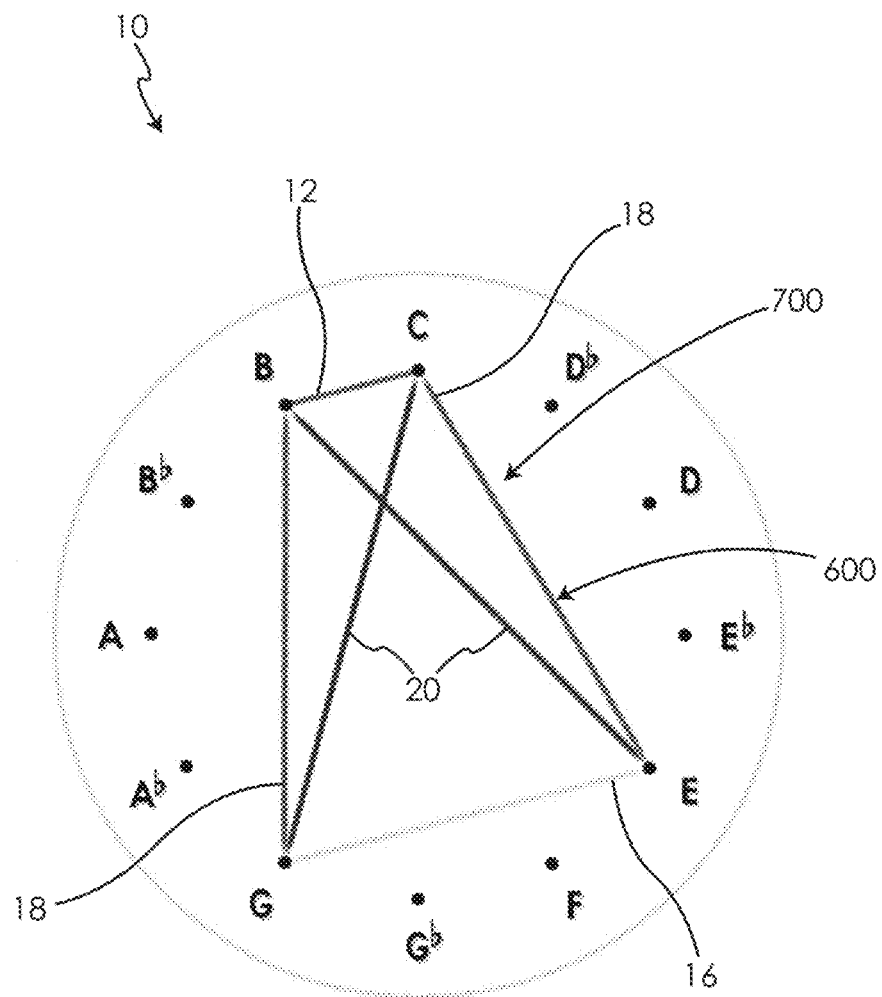
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
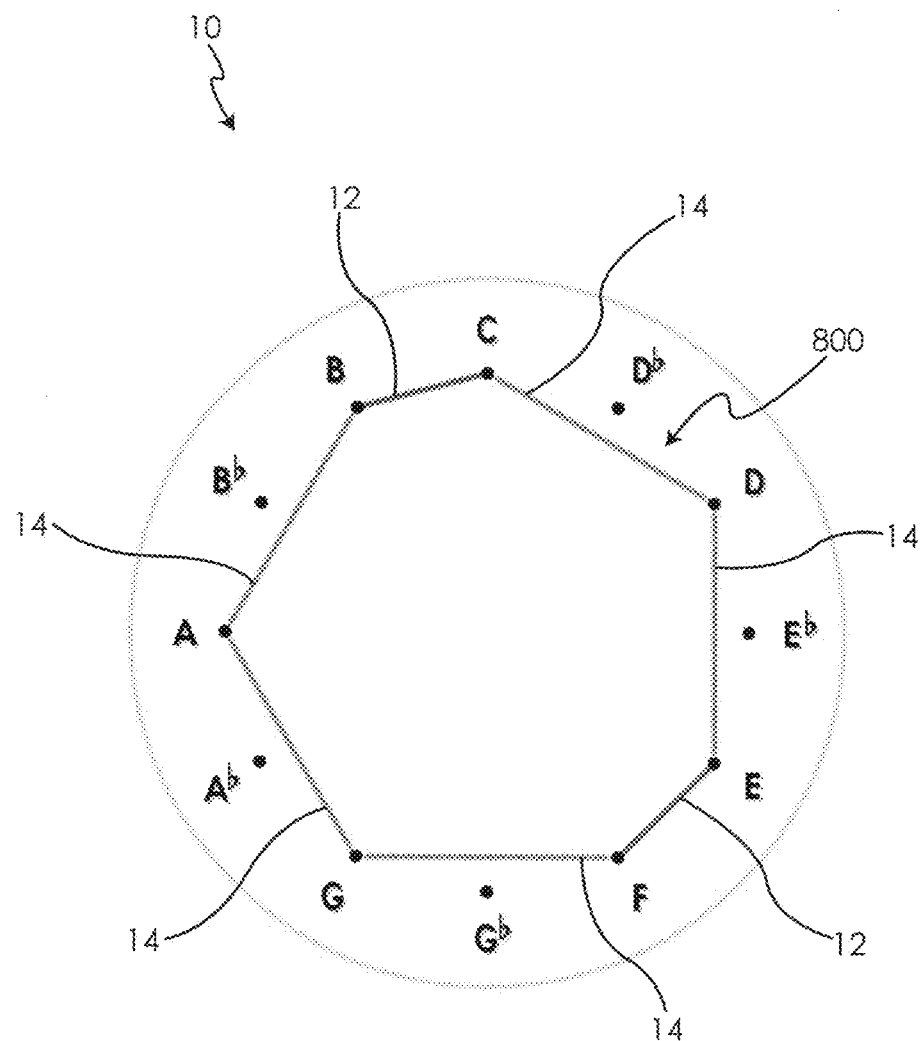
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
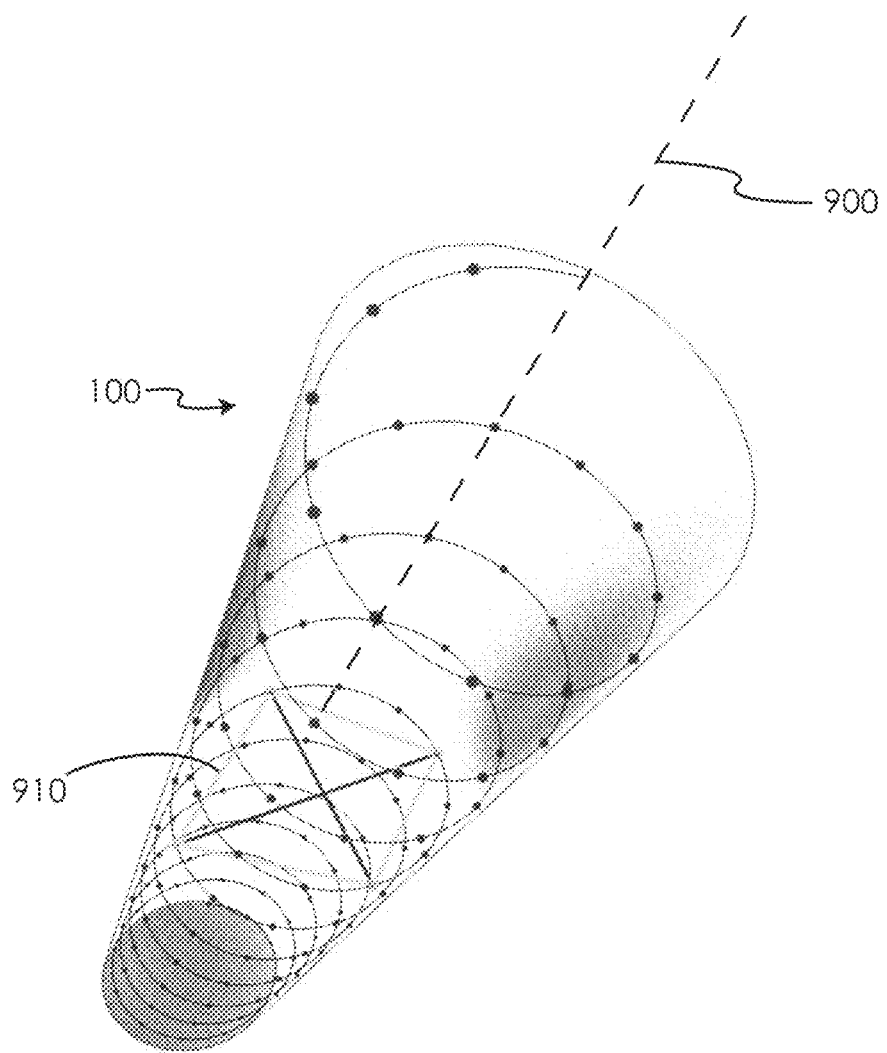
FIGS. 9-10 are diagrams of a helix showing a B diminished seventh chord.
Figure 10:
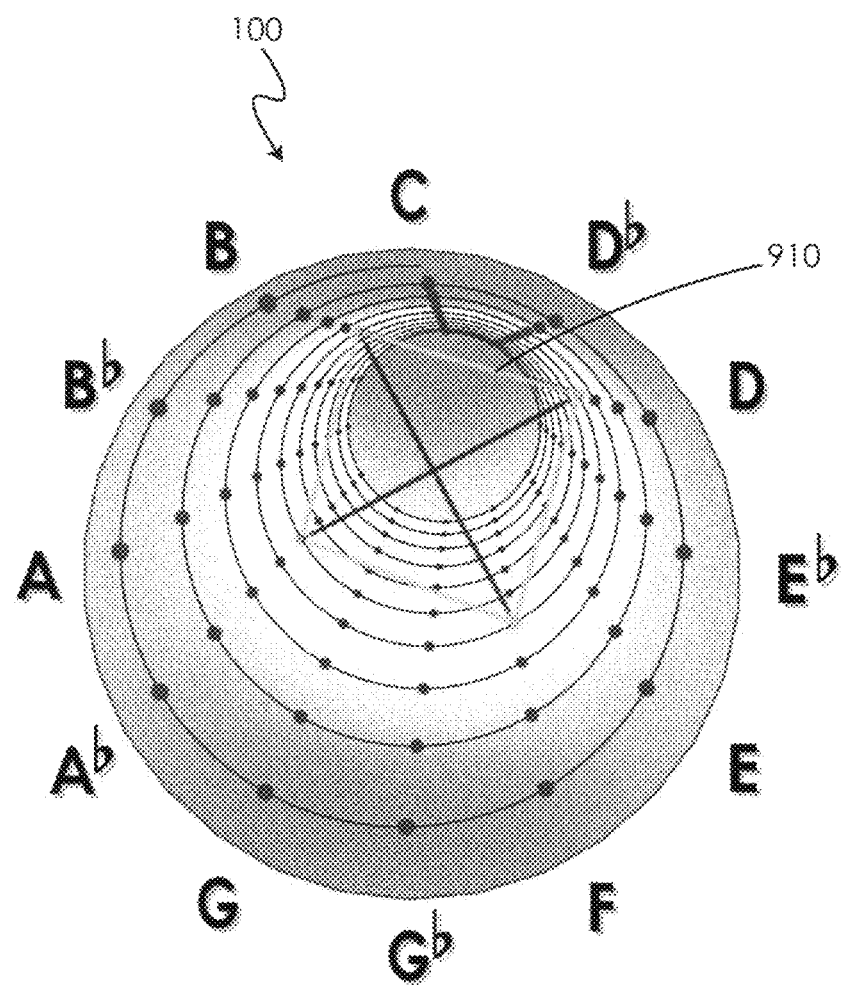

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
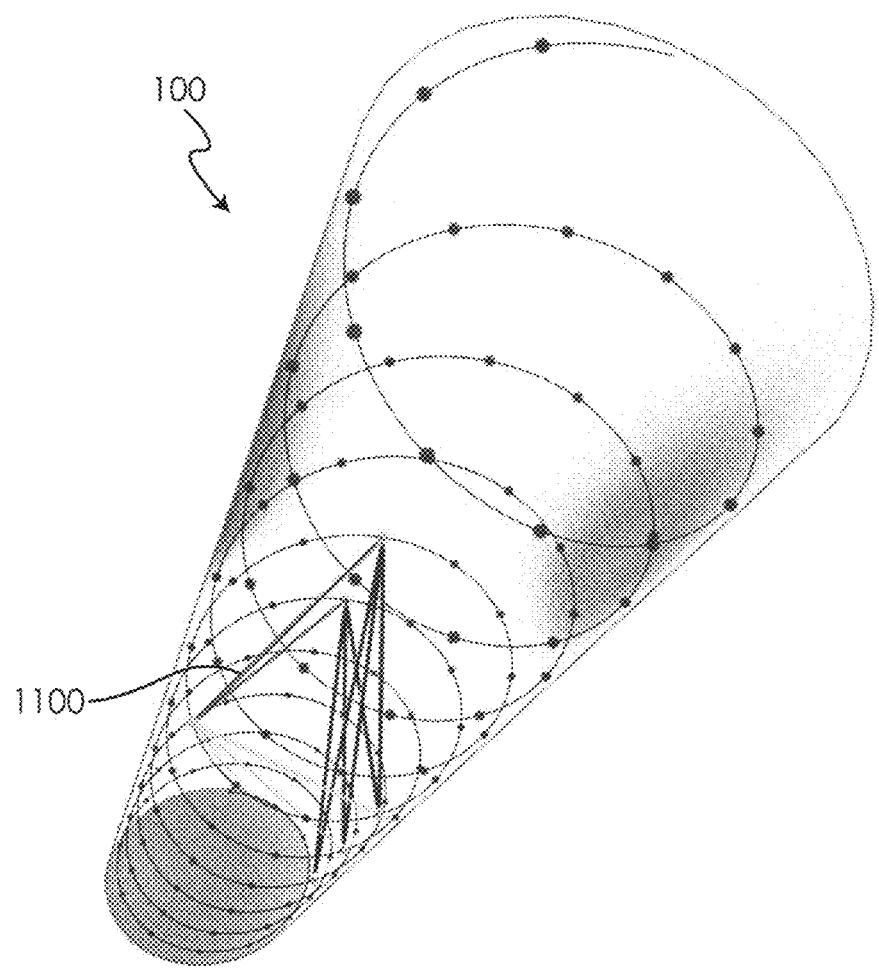
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. Utility patent application Ser. No. 12/023,375 filed Jan. 31, 2008 entitled "Device and Method for Visualizing Musical Rhythmic Structures" which is also hereby incorporated by reference.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums' in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
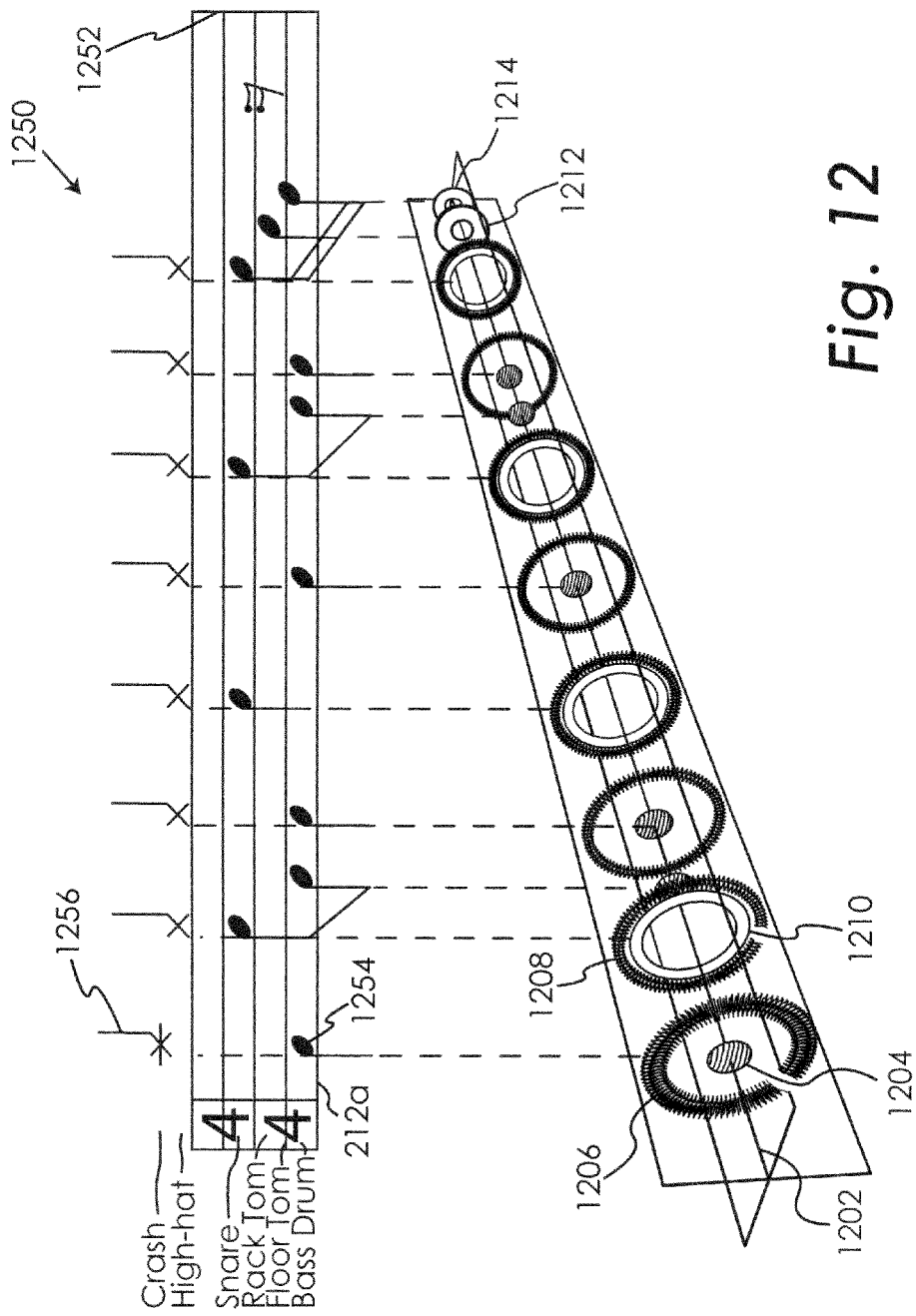
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. Those skilled in the art will recognize that other geometric shapes may be utilized to represent the sounds of the instruments within the scope of the disclosure.

Figure 13:
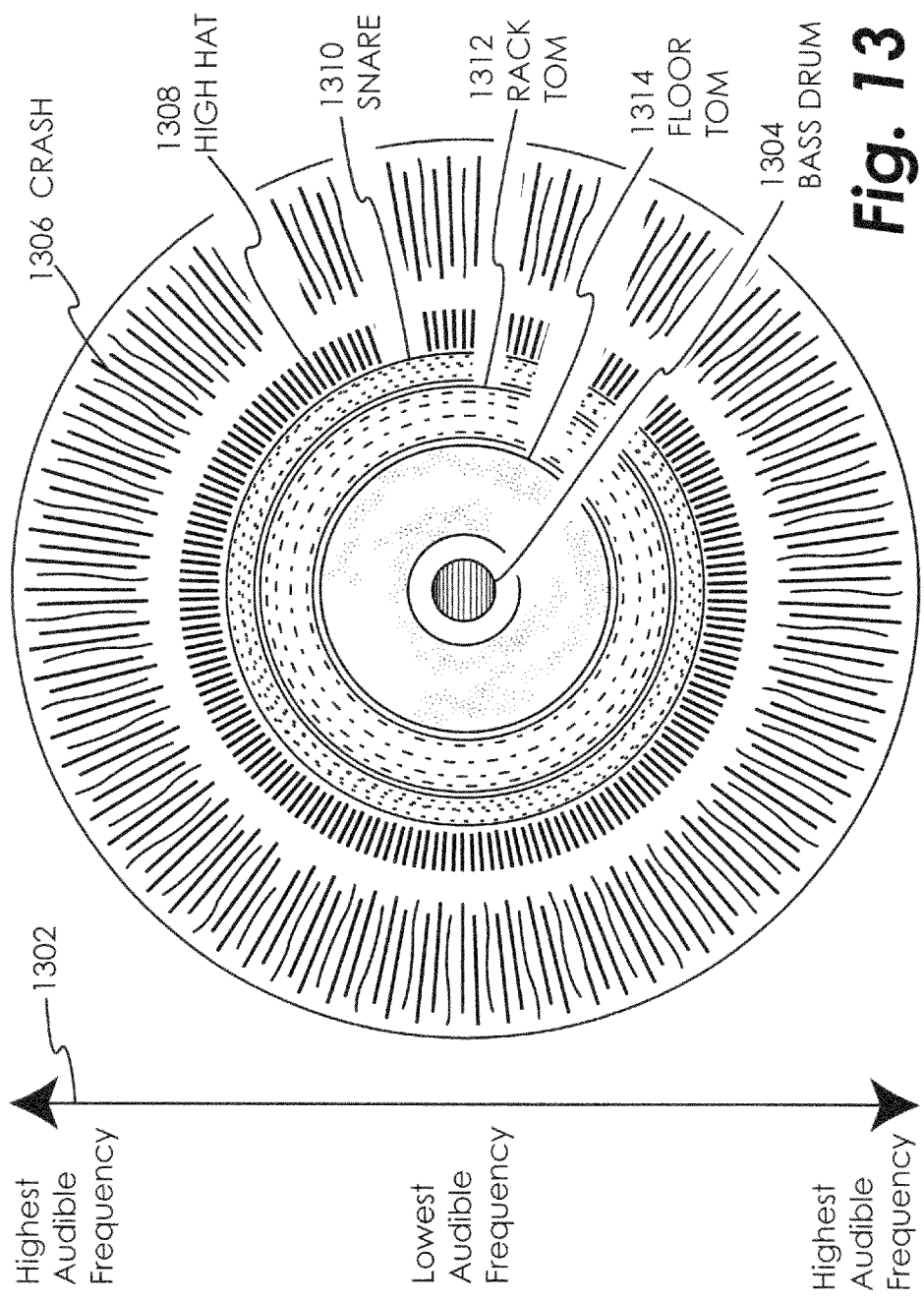
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
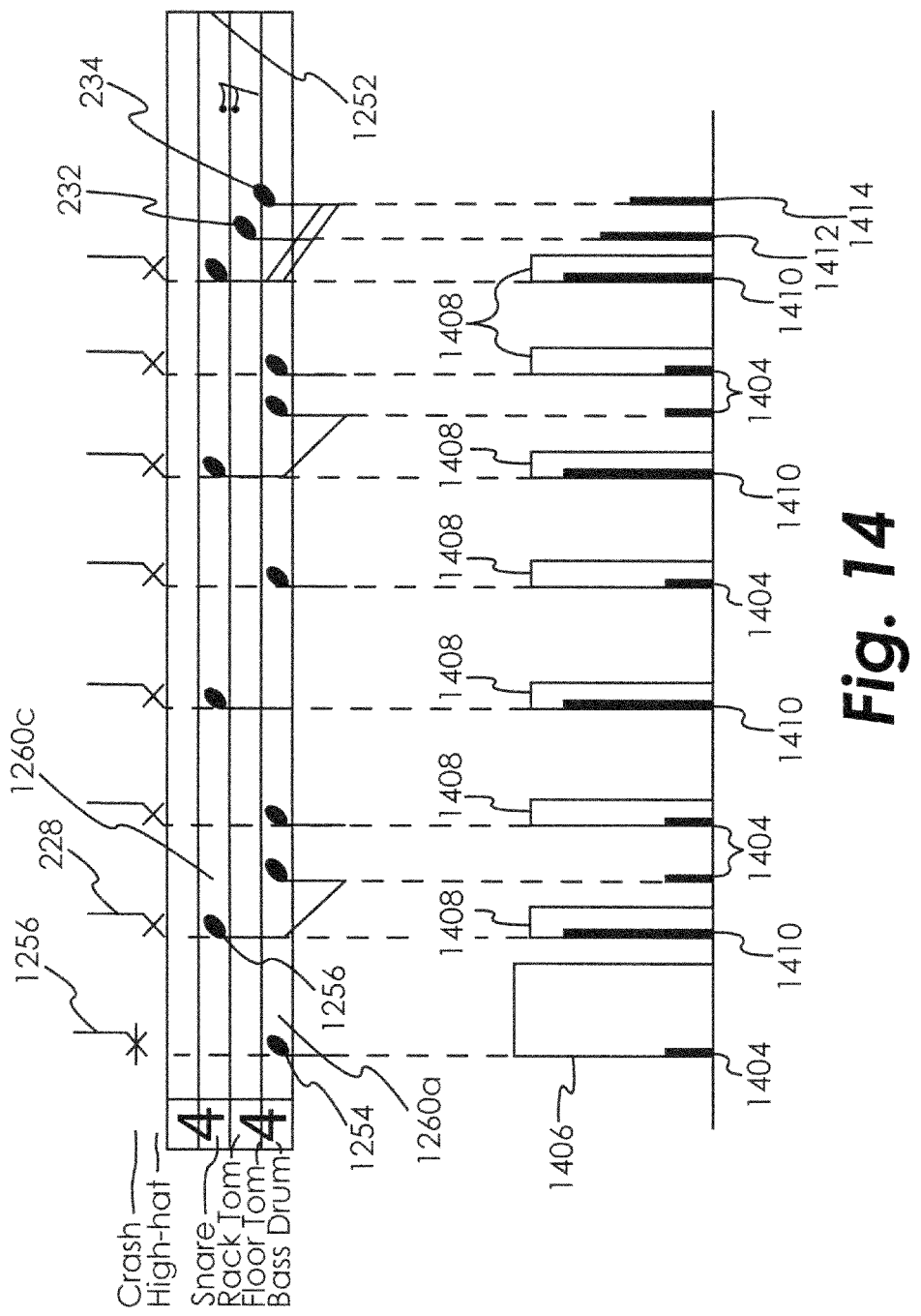
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202. In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar 1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260*a* of staff 1252. Likewise, bar 1410 (representing the snare drum) will be converted to a note 1256 in the second highest space 1260*c* of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

The present disclosure utilizes the previously described visualization methods as the basis for a system of foreign language processing and instruction. The easily visualized tonal and rhythmic shapes allow a person to "see" their sounds or words as they attempt to pronounce them correctly and clearly. The system can benefit individuals wishing to learn a foreign language outside of a traditional classroom setting. Even students having the benefit of a live instructor will improve their comprehension due to the intuitive feedback provided by the disclosed system. Actors who normally employ voice coaches to help them master a specific dialect for a particular role can also utilize the system to perfect their reproduction of the required accent.

Figure 15:
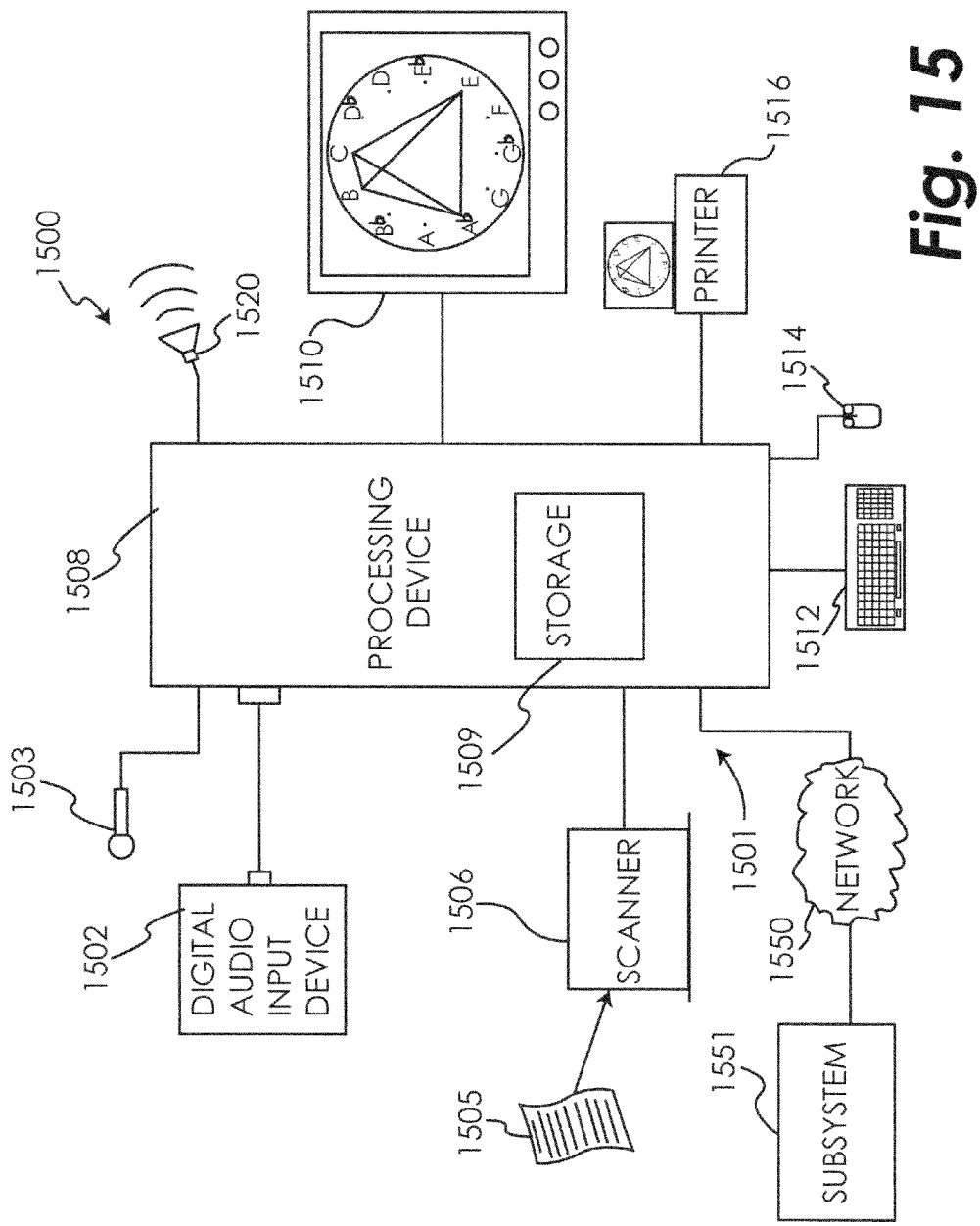
FIG. 15 is a schematic block diagram showing a foreign language processing system according to one embodiment.

FIG. 15, shows, in schematic form, one embodiment of a foreign language processing system 1500 according to the present disclosure. The system 1500 may include a first subsystem 1501 including a digital audio input device 1502, a microphone 1503, a scanning device 1506 for inputting written text 1505, a processing device 1508, data storage device 1509, a display 1510, user input devices such as keyboard 1512 and mouse 1514, a printer device 1516 and one or more speakers 1520. These devices are coupled to allow the input of a person's voice into the processing device 1508 so that their voice may be produced by the speaker 1520 and visual representations of their voice, optionally in conjunction with visual representations of corresponding foreign language words, may be displayed, printed or manipulated by users. Digital audio input device 1502 and scanning device 1501 are also operatively coupled to processing device 1508 to provide reference input for the user in the form of audio signals or written text.

The digital audio input device 1502 may include a digital music player such as an MP3 device or CD player, an analog music player, instrument or device with appropriate interface, transponder and analog-to-digital converter, or a digital music file, as well as other input devices and systems. The digital audio information may contain prerecorded voice recordings that can be visualized to serve as an example for the user when comparing visualizations of their own voice.

The processing device 1508 may be implemented on a personal computer, a workstation computer, a laptop computer, a palmtop computer, a wireless terminal having computing capabilities (such as a cell phone having a Windows CE or Palm operating system), a game terminal, or the like. It will be apparent to those of ordinary skill in the art that other computer system architectures may also be employed.

In general, such a processing device 1508, when implemented using a computer, comprises a bus for communicating information, a processor coupled with the bus for processing information, a main memory coupled to the bus for storing information and instructions for the processor, a read-only memory coupled to the bus for storing static information and instructions for the processor. The display 1510 is coupled to the bus for displaying information for a computer user and the input devices 1512, 1514 are coupled to the bus for communicating information and command selections to the processor. A mass storage interface for communicating with data storage device 1509 containing digital information may also be included in processing device 1508 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system. Display 1510 may be a liquid crystal device (LCD), a cathode ray tube (CRT), a plasma monitor, a holographic display, or other suitable display device. The mass storage interface may allow the processor access to the digital information in the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device 1509 may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device 1509 using the mass storage interface and downloads this information into random access memory for execution. The processor then executes an instruction stream from random access memory or read-only memory. Command selections and information that is input at input devices 1512, 1514 are used to direct the flow of instructions executed by the processor. Equivalent input devices 1514 may also be a pointing device such as a conventional trackball device. The results of this processing execution are then displayed on display device 1510.

The processing device 1508 is configured to generate an output for viewing on the display 1510 and/or for driving the printer 1516 to print a hardcopy. Preferably, the video output to display 1510 is also a graphical user interface, allowing the user to interact with the displayed information.

The system 1500 may optionally include one or more subsystems 1551 substantially similar to subsystem 1501 and communicating with subsystem 1501 via a network 1550, such as a LAN, WAN or the internet. Subsystems 1501 and 1551 may be configured to act as a web server, a client or both and will preferably be browser enabled. Thus with system 1500, remote teaching is made possible when an instructor is not able to be physically present. System 1500 may also be configured to be portable so an individual can continue to practice and improve their foreign language or dialect ability even after the sessions with a live instructor have ended, thereby avoiding the potential problem with stagnation or regression due to the lack of continuing instruction.

In operation, microphone 1503 is operative to receive or pick up words or phrases of a person attempting to speak a foreign language. In this context, foreign language is contemplated to mean a language other than the natural or familiar language of an individual. Microphone 1503 creates signals representative of the words or phrases that have been spoken and applies them to processor 1508. Processor 1508 creates tonal and rhythm visualization components from the microphone signals and displays them on display 1510. The material that is spoken may be reproduced via speaker 1520, if desired. The processing device 1508 may receive stored or archived visualization components, preferably in an encoded or digital format, from the data storage device 1509. Reference audio signals may also be retrieved from data storage device 1509 or digital audio input device 1502.

The visualization components, whether in encoded or unencoded form, contain information relating to the particular words or phrase of interest, including pitch, timbre, and volume, as non-limiting examples. The visualization components of the words or phrases spoken by a person may be stored in data storage device 1509, or recorded on removable or portable media, as may the visualization components of the same words or phrases spoken by an individual whose native language is that which the person is attempting to learn. The visualization components of the spoken words or phrases may be used to create a visual side-by-side comparison to aid the person in gauging his or her progress over time in learning the foreign language. By viewing the specific characteristics of the tonal and rhythm visualization components, e.g., shapes and colors, of the words or phrases spoken by the person, as compared to the same words or phrases spoken by the individual speaking in their native language, the person can immediately see the areas where their vocal technique is deficient, e.g., maintaining correct inflection, controlling voice modulation, etc. The visualization components allow the person to practice fundamentals, e.g., matching the pronunciation of a single word, as well as more complex techniques, e.g., reciting complete sentences with proper grammar. The person can then concentrate or focus on specific areas that require improvement or are most relevant for the needs of the person, with any improvement or regression being immediately visible on display 1510.

In order to visualize the individual components of a person's speech, the system 1500 can implement software operating as an audio signal or note extractor. The audio extractor examines the voice signals received by the microphone 1503 and determines which frequencies are most important to the sounding of a given syllable or word. The frequency content is then mapped to certain colors within a tonal circle or helix and displayed to the user. Various audio frequency extraction methods are described in U.S. Patent Application Ser. No. 61/025,374 filed Feb. 1, 2008 entitled "Apparatus and Method for Visualization of Music Using Note Extraction" which is hereby incorporated by reference.

Figure 16:
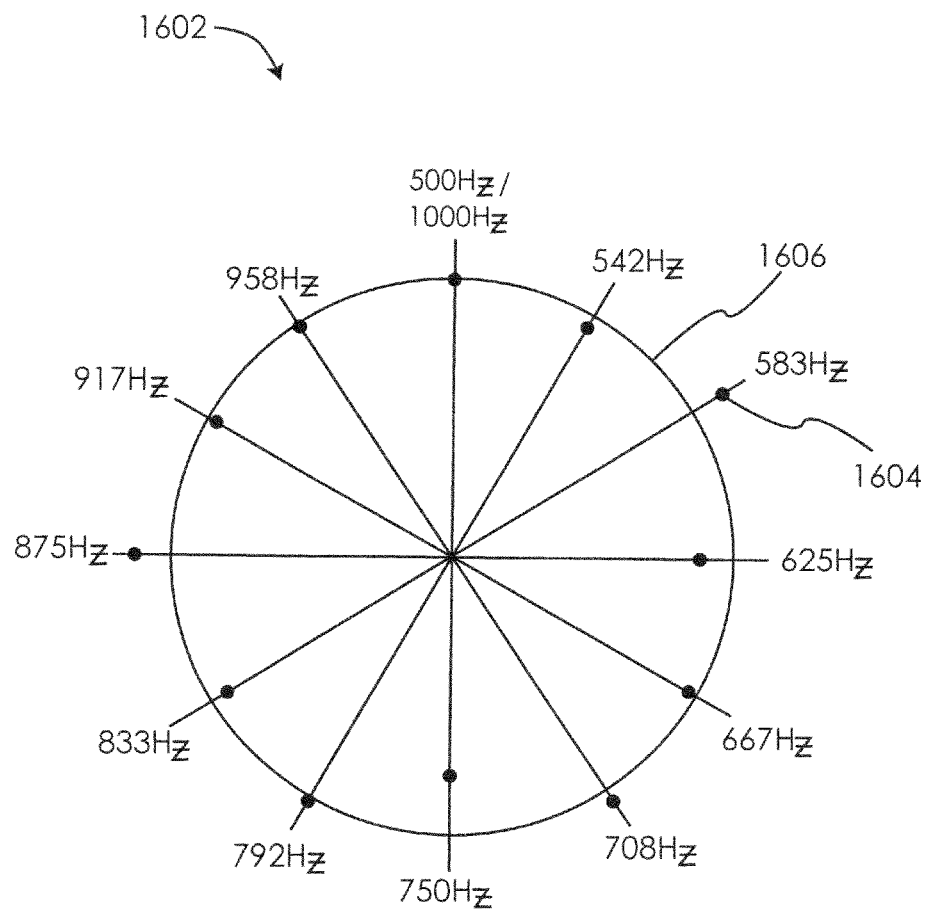
FIG. 16 depicts a visual representation of a sound spoken in a foreign language according to one embodiment.

It shall be understood that while the tonal circle and helix has been described above as having twelve subdivisions corresponding to twelve notes in a musical scale, a higher or lower number of subdivisions can be used to represent the complex nature of the human voice. This is particularly important when visualizing speech sounds or patterns. FIG. 16 depicts one embodiment where visualization 1602 is generated based on a person's voice, with the circle 1606 divided into an equal number of frequency intervals within a desired ranged (in this case, 500 Hz to 1000 Hz). The radial position of each of the indicators 1604 corresponds to the relative amplitude of the person's voice at that frequency. By observing that certain frequencies are more prevalent in certain spoken syllables, the student can use the visualizations to correct their pronunciation. For example, if the person is not producing an "S" sound with enough emphasis, one of the higher frequency components will be displayed closer to the center of circle 1606. Conversely, an over emphasized "B" sound will be displayed as a peak in a corresponding lower frequency. In addition to a single circle format, the visualization can be translated to helical form in order to display a multi-octave range of frequencies.

Figure 17:
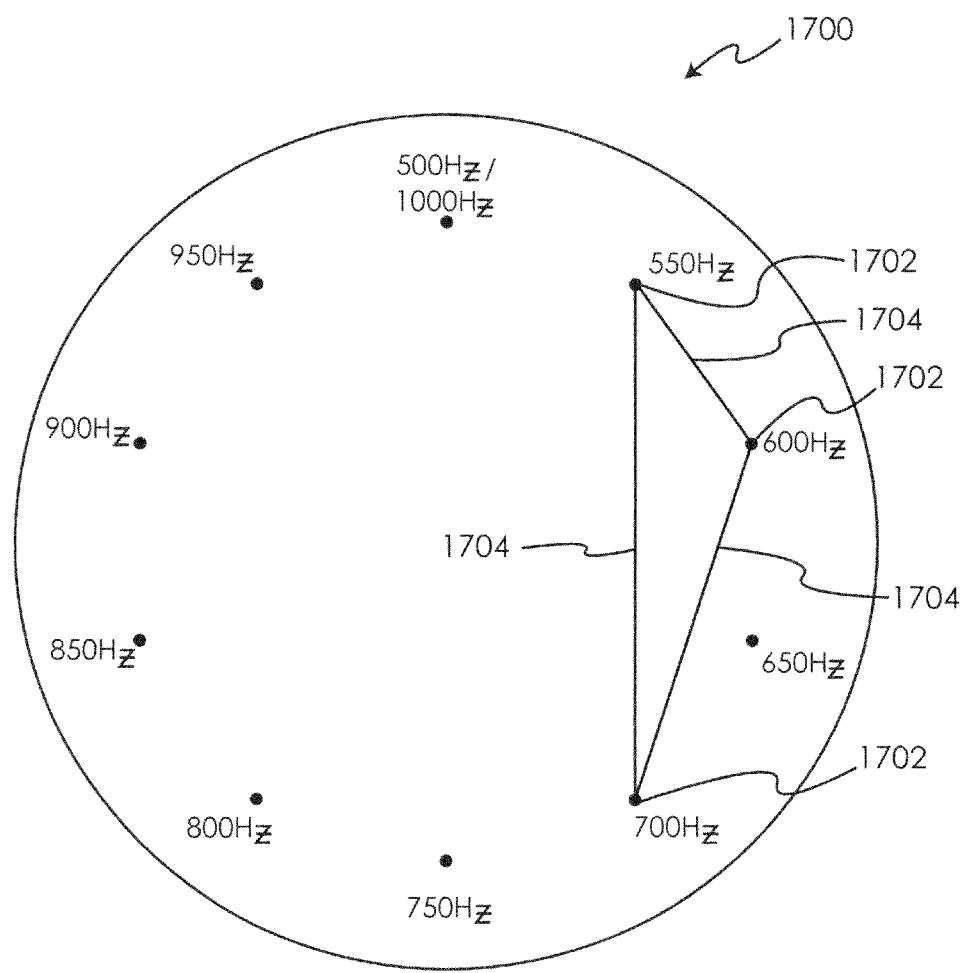
FIG. 17 depicts a visual representation of a multi-syllable word spoken in a foreign language according to one embodiment.

FIG. 17 shows an example of another visualization 1700 wherein lines 1704 connect points 1702 which represent the primary vocal frequency sensed for each syllable in a word. FIG. 17 displays the octave range from 500 Hz to 1000 Hz (one of the octaves within the human speech range), however it will be understood that any desired range can be used. The lines 1704 may also incorporate color as described hereinabove to further visualize the individual's vocal characteristics. In certain embodiments, the position and length of a line 1704 can represent pitch, with the color of the line 1704 representing the duration of time between tonal transitions. As another non-limiting example, the color of lines 1704 can correspond to the amplitude of each spoken syllable. In that way, particular vocal intonations, such as words spoken with an accent, can be identified in the encoded visualization signal information.

In addition to tonal frequency changes, the system 1500 can provide visualization of the rhythm components of a person's voice. Because the proper pronunciation of letters or words is often dependent on rhythm or cadence, these visualizations will help students of a foreign language understand whether they are correctly annunciating a particular word. For example, a "B" sound has a short attack time and a relatively longer release. This rhythm could be visualized as a small diameter spheroid, much like a bass drum as described hereinabove. On the other hand, an "S" sound is a more open ended sound which could be visualized much like a cymbal in the preceding examples.

The present disclosure contemplates that a user may purchase foreign language instruction or lessons pre-programmed on electronic storage media, with or without printed materials. The program or software, accessed by processing device 1508 via data storage device 1509, for example, will then provide a step-by-step process for learning various words or vocal techniques using the previously described understandable tonal and rhythm visualization systems. The program or software will provide speech visualization for the student, and the program can be configured to provide both the visualization of the word or phrase that the student was supposed to vocalize, as well as the word or phrase that was actually vocalized by the student. Through the use of this real-time visual feedback, a student can immediately determine both visually, and aurally, that a mistake was made. The correction that is required to be made in order to speak the passage properly is also evident from the visualization system, either by merely viewing the correct visualization shape, color, or pattern, or by hints or specific instruction to the student, e.g., "you need to roll your tongue more during 'R' sounds."

The present disclosure also contemplates that system 1500 may incorporate a "shape filter," which will show a particular shape or visualization using gray or dimly-lit lines. When the user speaks words that correspond to the desired visualization, the points and lines representing those sounds will change color or become otherwise accentuated to provide further visual reinforcement to the user that the correct sounds are being vocalized. The system 1500 can also be configured to only output "correct" sounds. That is, sounds or notes vocalized by the user that are not part of the word or shape being taught will not be sounded or visually displayed. This prevents the user from being discouraged during the learning process and helps the user focus on the desired sounds.

The program or software will also be able to maintain statistics relating to the user's accuracy rate and provide rewards for improved performance. The student's accuracy can be measured both in terms of actual correct sounds in addition to rhythm accuracy. In certain embodiments, the system will keep track of which words or phrases the user has mastered so that the user can make more efficient use of practice time, concentrating on areas of difficulty. The program or software can also be configured to require a certain level of skill or mastery of a set of words or phrases before allowing the student to continue to the next level or stage of instruction. The mastery level and statistical data for each user can be managed using unique user login information. When a user logs in, the system will be able to retrieve all of the data associated with that user. This will allow multiple users to utilize a single system as in a multi-use classroom environment or by accessing the software from an application service provider using the internet or other appropriate communications link. In addition, data storage device 1509 can be used to save the current training or performance session, along with all associated audio and visualization information, for later retrieval and analysis.

The instruction software or program can be configured to include a complete instructional regimen, or be sold as individual programs that require the purchase of successive modules as the student progressed in expertise. Sales of the instructional modules can be through stores, by on-line sales, or through direct downloads of software, and proof of prior accomplishment can be required to purchase the next module in an instructional series, if such control is desired.

Remote access to subsystem 1501 via network 1550 can provide help from an actual foreign language instructor or voice coach if a student needs additional help, or to demonstrate a level of accomplishment to enable advancement, for example. Access to an instructor may entail extra cost or a certain amount of instructor time may be included in the cost of the instruction programs or modules. Subsystem 1551, connected via network 1550, may also provide a source of instruction that can supplement or take the place of the previously described pre-programmed cards or modules, as well as a source of additional information, "extra credit" exercises or practice pieces, or the ability to purchase added components for system 1500 or other items. Downloads of the instructional software can also be available via subsystem 1551 and network 1550. In certain embodiments, a "virtual" instructor can be provided, such as computer generated voice, with or without a graphical human representation, which prompts the user through the various exercises The system 1500 can also be implemented as a video gaming system in which foreign language instruction can be combined with video games to provide additional interest and enjoyment to learning language, through the use of the tonal and rhythm visualization systems, of course. Games and interactive exercises can be included in the previously described pre-programmed modules as well. The games can award points based on performance of certain words or musical scales, and allow users to collaborate and play against each other remotely over a network. The use of games in connection with the visualization systems can be especially interesting for younger students.

While the disclosure has been illustrated and described in detail in the drawings and foregoing description, the same is to be considered as illustrative and not restrictive in character, it being understood that only the preferred embodiments have been shown and described and that all changes, modifications and equivalents that come within the spirit of the disclosure provided herein are desired to be protected. The articles "a,", "an," "said," and "the" are not limited to a singular element, and may include one or more such elements.

What is claimed:

1. A foreign language processing system, comprising:
   a user control device;
   a processing device operatively connected to said user input device;
   a microphone for sensing a spoken word from the user and operatively connected to said processing device; and
   a display operatively connected to said processing device;
   wherein:
   said processing device executes computer readable code to select a foreign language word which corresponds to the meaning of a native language word entered by a user using said user control device;
   wherein:
   said processing device executes computer readable code to create a first visual representation of frequency relationships within said foreign language word for output on said display; and
   wherein:
   said first visual representation is generated according to a method comprising the steps of:
   (a) placing twelve labels in a pattern of a circle, said twelve labels corresponding to twelve respective frequencies, such that moving clockwise or counter-clockwise between adjacent ones of said labels represents a first frequency interval;
   (b) identifying an occurrence of a first frequency within the foreign language word;
   (c) identifying an occurrence of a second frequency within the foreign language word;
   (d) identifying a first label corresponding to the first frequency;
   (e) identifying a second label corresponding to the second frequency;
   (f) creating a first line connecting the first label and the second label, wherein:
      (1) the first line is a first color if the first frequency and the second frequency are separated by the first frequency interval:
      (2) the first line is a second color if the first frequency and the second frequency are separated by a first multiple of the first frequency interval;
      (3) the first line is a third color if the first frequency and the second frequency are separated by a second multiple of the first frequency interval;
      (4) the first line is a fourth color if the first frequency and the second frequency are separated by a third multiple of the first frequency interval;
      (5) the first line is a fifth color if the first frequency and the second frequency are separated by a fourth multiple of the first frequency interval; and
      (6) the first line is a sixth color if the first frequency and the second frequency are separated by a fifth multiple of the first frequency interval.

2. The system of claim 1, wherein step (a) further comprises arranging each of the twelve labels to be substantially evenly spaced from each adjacent label.

3. The system of claim 2, wherein step (a) further comprises arranging each of the twelve labels to be spaced 30 degrees from each adjacent label.

4. The system of claim 1, wherein the first color is red, the second color is orange, the third color is yellow, the fourth color is green, the fifth color is blue and the sixth color is purple.

5. The system of claim 1, wherein:
   the first color has a first wavelength that is larger than a second wavelength of the second color;
   the second wavelength is larger than a third wavelength of the third color;
   the third wavelength is larger than a fourth wavelength of the fourth color;
   the fourth wavelength is larger than a fifth wavelength of the fifth color; and
   the fifth wavelength is larger than an sixth wavelength of the sixth color.

6. The system of claim 1, wherein a second visual representation of frequency relationships within said spoken word is generated using said method, said second visual representation being displayed simultaneously on said display with said first visual representation.

7. The system of claim 1, wherein the brightness of said first line transitions from a relatively dimmer state to a relatively brighter state on said display when a first frequency relationship within said spoken word matches that of said first visual representation.

8. The method of claim 1, further comprising the steps of:
   (g) identifying an occurrence of a third frequency within said foreign language word;
   (h) identifying a third label corresponding to the third frequency;
   (i) creating a second line connecting the second label and the third label; and
   (j) creating a third line connecting the third label and the first label.

9. A foreign language processing system, comprising:
   a user control device;
   a processing device operatively connected to said user input device;
   a microphone for sensing a spoken word from the user and operatively connected to said processing device; and
   a display operatively connected to said processing device;
   wherein:
   said processing device executes computer readable code to select a foreign language word which corresponds to the meaning of a native language word entered by a user using said user input device;
   wherein:
   said processing device executes computer readable code to create a first visual representation of frequency relationships within said foreign language word for output on said display; and
   wherein:
   said first visual representation is generated according to a method comprising the steps of:
   (a) placing twelve labels in a pattern of a circle, said twelve labels corresponding to twelve respective frequencies, such that moving clockwise or counter-clockwise between adjacent ones of said labels represents a first frequency interval;
   (b) identifying an occurrence of a first frequency within the within the foreign language word;
   (c) identifying an occurrence of a second frequency within the foreign language word;
   (d) identifying a first point on the circle, said first point corresponding to the first frequency;
   (e) identifying a second point on the circle, said second point corresponding to the second frequency;

(f) creating a first line connecting the first label and the second label, wherein:
  (1) the first line is a mixture of a first color and a second color if the first frequency and the second frequency are separated by more than the first frequency interval and less than a first multiple of the first frequency interval;
  (2) the first line is a mixture of a second color and a third color if the first frequency and the second frequency are separated by more than the first multiple of the first frequency interval and less than a second multiple of the first frequency interval;
  (3) the first line is a mixture of a third color and a fourth color if the first frequency and the second frequency are separated by more than the second multiple of the first frequency interval and less than a third multiple of the first frequency interval;
  (4) the first line is a mixture of a fourth color and a fifth color if the first frequency and the second frequency are separated by more than the third multiple of the first frequency interval and less than a fourth multiple of the first frequency interval;
  (5) the first line is a mixture of a fifth color and a sixth color if the first frequency and the second frequency are separated by more than the fourth multiple of the first frequency interval and less than a fifth multiple of the first frequency interval.

10. The system of claim 9, wherein the first color is red, the second color is orange, the third color is yellow, the fourth color is green, the fifth color is blue and the sixth color is purple.

11. The system of claim 9, wherein:
the first color has a first wavelength that is larger than a second wavelength of the second color;
the second wavelength is larger than a third wavelength of the third color;
the third wavelength is larger than a fourth wavelength of the fourth color;
the fourth wavelength is larger than a fifth wavelength of the fifth color; and
the fifth wavelength is larger than an sixth wavelength of the sixth color.

12. The system of claim 9, wherein a second visual representation of frequency relationships within said spoken word is generated using said method, said second visual representation being displayed simultaneously on said display with said first visual representation.

13. The system of claim 9, wherein the brightness of said first line transitions from a relatively dimmer state to a relatively brighter state on said display when a first frequency component relationship of said spoken word matches that of said first visual representation.

14. The method of claim 9, further comprising the steps of:
  (g) identifying an occurrence of a third frequency within said foreign language word;
  (h) identifying a third label corresponding to the third frequency;
  (i) creating a second line connecting the second label and the third label; and
  (j) creating a third line connecting the third label and the first label.

15. The system of claim 14, wherein the brightness of said second line transitions from a relatively dimmer state to a relatively brighter state on said display when a second frequency component relationship of said spoken word matches that of said first visual representation.

\* \* \* \* \*